(12) United States Patent
Pessin et al.

(10) Patent No.: US 7,464,757 B2
(45) Date of Patent: Dec. 16, 2008

(54) METHOD FOR CONTINUOUSLY BATCH MIXING A CEMENT SLURRY

(75) Inventors: Jean-Louis Pessin, Houston, TX (US); Laurent Coquilleau, Houston, TX (US); Josh Rayner, Houston, TX (US); Michael Woodmansee, Simonville, SC (US)

(73) Assignee: Schlumberger Technology Corporation, Sugar Land, TX (US)

( * ) Notice: Subject to any disclaimer, the term of this patent is extended or adjusted under 35 U.S.C. 154(b) by 26 days.

(21) Appl. No.: 11/424,699

(22) Filed: Jun. 16, 2006

(65) Prior Publication Data
US 2007/0289737 A1 Dec. 20, 2007

(51) Int. Cl.
*E21B 33/00* (2006.01)
*B28C 7/04* (2006.01)
*B28C 5/00* (2006.01)
*B28C 7/16* (2006.01)

(52) U.S. Cl. .............................. 166/285; 366/8; 366/14; 366/15

(58) Field of Classification Search ..................... 366/8, 366/14, 51
See application file for complete search history.

(56) References Cited

U.S. PATENT DOCUMENTS

| | | | |
|---|---|---|---|
| 4,705,217 A | 11/1987 | Hartley | |
| 5,046,855 A | 9/1991 | Allen | |
| 5,103,908 A * | 4/1992 | Allen | 166/285 |
| 5,114,239 A | 5/1992 | Allen | |
| 5,289,877 A * | 3/1994 | Naegele et al. | 166/285 |
| 5,452,954 A | 9/1995 | Handke | |
| 5,522,459 A | 6/1996 | Padgett | |
| 5,570,743 A | 11/1996 | Padgett | |
| 6,491,421 B2 * | 12/2002 | Rondeau et al. | 366/8 |
| 6,644,844 B2 * | 11/2003 | Neal et al. | 366/10 |
| 2005/0201197 A1 | 9/2005 | Duell | |

FOREIGN PATENT DOCUMENTS

EP 0419281 B1 3/1991

* cited by examiner

*Primary Examiner*—Zakiya W Bates
*Assistant Examiner*—Angela M DiTrani
(74) *Attorney, Agent, or Firm*—Michael Flynn; Rodney Warfford; David Cafe

(57) ABSTRACT

A method for continuously batch mixing a homogenized cement slurry is provided that includes providing first and second mix tubs which each perform a process which include: receiving a measured quantity of solid and liquid constituents of a cement mixture; mixing the solid and liquid constituents of the cement mixture into a homogenized cement slurry; and delivering the homogenized cement slurry into a well. In this method, the first and second mix tubs alternate these delivering processes in a synchronized manner such that one of the first and the second mix tubs continually delivering its corresponding homogenized cement slurry to a well pumping system.

18 Claims, 6 Drawing Sheets

METHOD FOR CONTINUOUSLY BATCH MIXING A CEMENT SLURRY

FIELD OF THE INVENTION

The present invention relates generally to a method for preparing a cement slurry for use in an oil well, and more particularly to such a method of preparing a cement slurry in a continuous batch mix process.

BACKGROUND

Batch mixers exist for many industries, and generally involve combining two or more constituent elements into a container and mixing them until a homogeneous mixture exists. In mixing cement slurries for the oil drilling and production industry, a cement slurry must be mixed from its solid and liquid constituent elements in very precise proportions in order to obtain desired resultant properties in the mixture.

When only a small volume of a cement slurry is required to be pumped in a well, a batch mixing process is often used. The batch mixing process is very simple to control since it consists of mixing a predetermined volume of solids with a predetermined volume of liquid.

However, when larger volumes of a cement slurry are required, the slurry must be mixed continuously as it is pumped downhole into a well. Generally this is accomplished by continuously adding and mixing the solid and liquid constituent elements of the cement slurry into the mix tub, while simultaneously pumping the mixed slurry out of the mix tub. A problem with this process is that it requires precise and continuous control of the "addition rates" or the rates at which the solid and liquid constituents are added into the mix tub.

Although the addition rates of the liquid constituents are easily measured and controlled, measuring and controlling the addition rates of the solid constituents is much more difficult due to the inconsistency of solids flow, which is often due in part to the degree of fluidization of the solids mixture, variations in the packing or compactness of the solid mixture, the moisture content of the solid mixture, and/or other variations in the environment of the solid mixture or other variations in the solid mixture itself. In fact, due to these difficulties associated with the solid addition rate, a common mixing method involves measuring the density of the resultant slurry mixture within the mix tub, rather than directly measuring the rate of addition of the constituent elements.

Using such a method, the rates of addition of the solid and liquid constituents are continuously modified to maintain the mixture density at a desired target value. Such a process requires an experienced, skilled operator in order to obtain the desired proportions of the solid and liquid constituents in the slurry mixture, and is complicated by the relatively large lag time which exists between a change in the addition rate of the constituents and the corresponding change in the density measurement of the resultant slurry mixture.

As a result of the difficulty in continuously controlling the addition rate of the solid constituents, it is considerably more difficult to consistently mix to the desired accuracy with a continuous mixing process than it is with a batch mixing process. Accordingly, a need exists for a process that combines the simplicity and precision of a batch mixing process with the unlimited volume output of a continuous mixing process.

SUMMARY

In one embodiment, the present invention is a method for continuously batch mixing a homogenized cement slurry that includes providing first and second mix tubs which each perform a batch mixing process which includes: receiving a measured quantity of solid and liquid constituents of a cement mixture; mixing the solid and liquid constituents of the cement mixture into a homogenized cement slurry; and delivering the homogenized cement slurry to be pumped into a well. In this method, the first and second mix tubs alternate these batch mixing processes in a synchronized manner such that at any given time one or the other of the first and the second mix tubs is delivering its homogenized cement slurry to be pumped into the well.

In another embodiment, the present invention is a method for continuously batch mixing a homogenized cement slurry that includes providing first, second, and third mix tubs which each perform a batch mixing process that includes: receiving a measured quantity of solid and liquid constituents of a cement mixture; mixing the solid and liquid constituents of the cement mixture into a homogenized cement slurry; and delivering the homogenized cement slurry to be pumped into a well. In this method, the first, second, and third mix tubs alternate said batch mixing processes in a synchronized manner such that at any given time one of the first, second and third tubs is delivering its corresponding homogenized cement slurry to be pumped into the well.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF EMBODIMENTS OF THE INVENTION

When drilling oil wells, cylindrical tubes, or casings, are often cemented into the well to stabilize the casing in the wellbore as well as to provide a means of isolating various geological zones. As shown in FIGS. 1-6, embodiments of the present invention are directed to a continuous batch mix system for receiving a cement mixture, mixing the received cement mixture into a homogenized cement slurry, and delivering the homogenized cement slurry to be pumped into an oil well. In such a system, a predetermined amount of the liquid and solid constituents of the cement mixture are combined in a mix tub, and homogenized therein prior to the resultant slurry being pumped out of the mix tub.

For example, in one embodiment the continuous batch mix system includes a first mix tub and a second mix tub. In such an embodiment, the first mix tub receives the constituent elements of a cement mixture and mixes them into a homogenized cement slurry. A second mix tub then similarly receives the constituent elements of a cement mixture and similarly mixes them into a homogenized cement slurry. In one embodiment, as the second mix tub receives and mixes the constituent elements, the homogenized slurry in the first mix tub is simultaneously pumped into the well. In such an embodiment, the first and second mix tubs alternate in performing the functions of mixing and delivering slurry until the desired amount of homogenized cement slurry has been pumped into the well.

Figure 1:
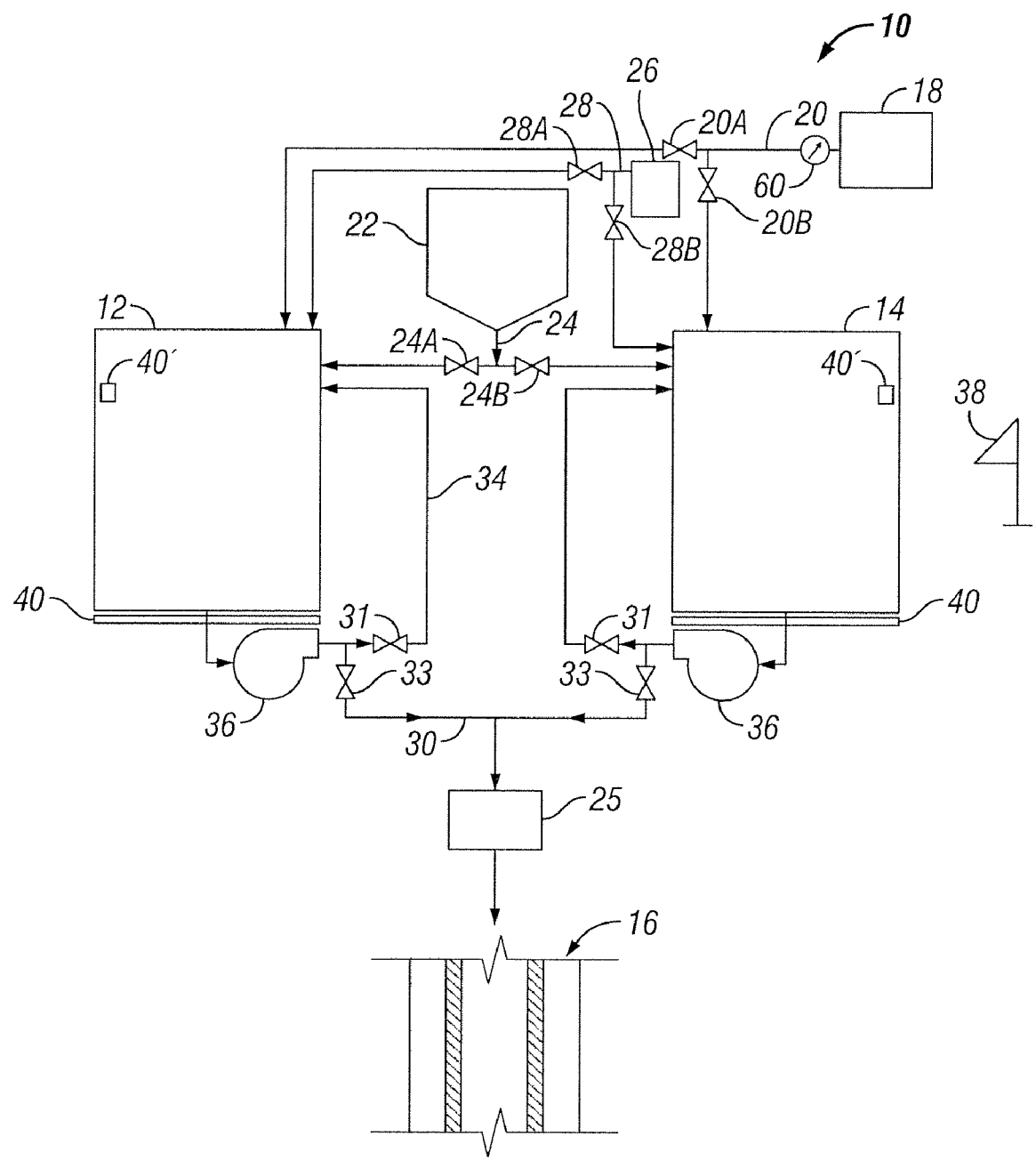
FIG. 1 is a schematic view of a continuous batch mix system according to one embodiment of the present invention.

FIG. 1 shows a continuous batch mix system 10 according to one embodiment of the present invention. As shown, the system 10 includes a first mix tub 12 and a second mix tub 14. In one embodiment, each mix tub 12,14 receives separated constituent elements of a cement mixture, mixes the elements therein to form a homogenized cement slurry, and delivers the homogenized cement slurry to be pumped into a well 16.

As shown in FIG. 1, a liquid source 18 containing liquid constituents of a cement mixture is connected to each mix tub 12,14. In one embodiment the liquid source 18 is connected to a branched conduit 20, which in turn is connected to both the first mix tub 12 and to the second mix tub 14. The branched liquid conduit 20 allows a single liquid source 18 to provide liquid constituents of the cement mixture to both mix tubs 12,14.

A surge tank (or another appropriate bulk delivery source) 22 containing solid constituents of a cement mixture is also connected to each mix tub 12,14. In one embodiment the surge tank 22 is connected to a branched conduit 24, which in turn is connected to both the first mix tub 12 and to the second mix tub 14. The branched solids conduit 24 allows the surge tank 22 to provide solid constituents of the cement mixture to both mix tubs 12,14.

In one embodiment the liquid source 18 includes mix fluid, such as water, and the surge tank 22 includes a solid mixture of cement chemicals. In some applications, such as in some offshore installations, the liquid source 18 and the surge tank 22 do not include all of the components of the desired resultant cement slurry. For example, in some instances some desirable cement chemicals are not present in the solid mixture in the surge tank 22 and must instead be added separately. These chemicals or additives are typically added in liquid form.

In such an instance, one or more additional liquid sources 26 containing these liquid additives is also connected to each mix tub 12,14. These additives may include chemicals such as fluid loss additives, retarders, anti-foaming additives, extenders and/or other additives. As with the first liquid source 18, the one or more additional liquid sources 26 may each be connected to a branched conduit 28 connected to both the first mix tub 12 and to the second mix tub 14 to allow the additional liquid source(s) 26 to provide the additional liquid additives of the cement mixture to both mix tubs 12,14. As such, in one embodiment, the liquid source 18 includes a mix fluid, such as water, the surge tank 22 includes a solid mixture of cement chemicals, and the additional liquid source(s) 26 include additional liquid additives of the cement mixture.

Figure 2:
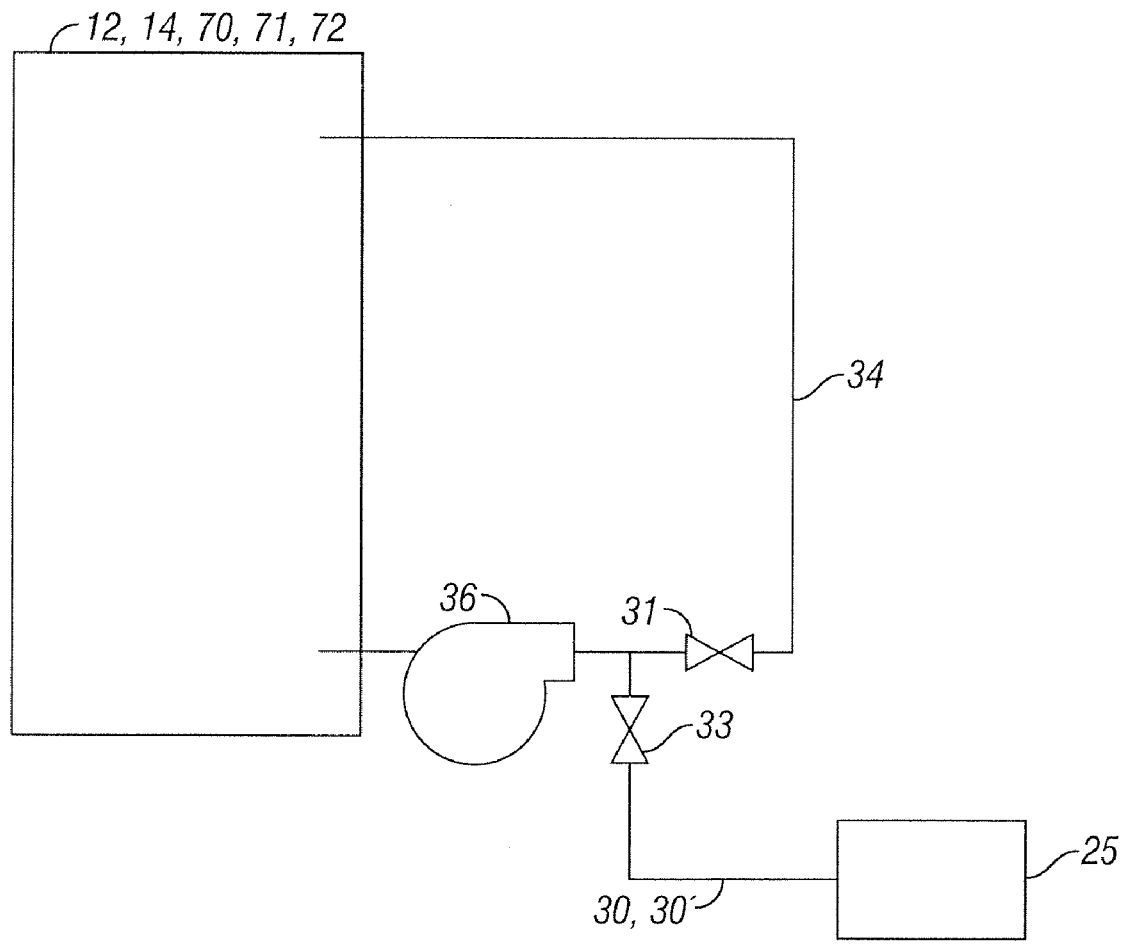
FIG. 2 is a side view of a mixing device for use with a mix tub that forms a portion of the continuous batch mix system of FIG. 1.

After receiving the solid and liquid constituents of a cement mixture, each mix tub 12,14 mixes the constituents to form a homogenized cement slurry. In the embodiment of FIG. 2, a recirculation line 34 facilitates the homogenization of the cement mixture in each mix tub 12,14 by recirculating the slurry constituents until a homogenized cement slurry is formed. This homogenization can be accomplished by recirculating the constituents in the mix tub 12,14 as shown and/or by agitating the constituents in the mix tub 12,14, such as by use of mix paddles, vibrators or other similar devices. Alternatively the constituents may be homogenized by any appropriate means.

In the depicted embodiment, the recirculation line 34 includes a conduit which connects a lower portion of each mix tub 12,14 to a higher portion of each mix tub 12,14. A pump 36 is also connected to the recirculation line 34. The pump 36 pumps the liquid and solid constituents of the cement mixture from a lower portion of the mix tub 12,14 to a higher portion of the mix tub 12,14 allowing the constituent elements to continually recirculate within the mix tub 12,14. This recirculation of the constituent elements of the cement mixture creates an agitation of the elements which contributes to homogenizing the mixture into a homogenized cement slurry. Note that in other embodiments the recirculation line 34 may receive the contents of the mix tub 12,14 at any elevation in the tub 12,14 and return the contents to any other elevation in the tub 12,14.

In one embodiment, the attachment of the solids conduit 24 to each mix tub 12,14 is adjacent to the upper attachment of the recirculation line 34 to its corresponding mix tub 12,14. This further facilitates the homogenization of the solid and liquid consistent elements within each mix tub 12,14 since the solid constituents from the solids conduit 24 are immediately dispersed and entrained upon entry to the mix tub 12,14 by the fluid exiting the adjacently positioned upper end of the recirculation line 34.

As shown in FIGS. 1 and 2, after a homogenized cement slurry has been formed in each mix tub 12,14, the slurry is delivered to an outlet conduit 30, which is fluidly connected to a pumping system 25 which pumps the slurry into the well 16. As shown, the outlet conduit 30 may also be fluidly connected to the recirculation pump 36. As such, the recirculation pump 36 may be used both to direct the cement constituents to the recirculation line 34 to form a homogenized cement slurry; and to direct the homogenized mixture to the pumping system 25 through the outlet conduit 30. The direction of flow from the recirculation pump 36 is dependent on valves 31 and 33. For example, when a recirculation line valve 31 is open and an outlet conduit valve 33 is closed, fluid is directed to the recirculation line 34; and when the recirculation line valve 31 is closed and the outlet conduit valve 33 is open fluid is directed to the outlet conduit 30.

As shown in FIG. 1, in one embodiment a control system 38 is electrically connected to valves 20a-b, 24a-b, and 28a-b which respectively control the delivery of constituents from the liquid source 18, the surge tank 22, and the additional liquid source(s) 26 to the mix tubs 12,14; and valves 31,33 which respectively control the delivery of the constituents from the mix tubs 12,14 to the recirculation line 34 and the outlet conduit 30. In such an embodiment, the control system 38 is able to initiate and shut off flow from the each of the liquid source 18, the surge tank 22, the additional liquid source(s) 26, and the outlet conduit 30. In alternative embodiments, the control system 38 may be manually or automatically operated. As is also shown in FIG. 1, in one embodiment a measurement system 40 is attached to each mix tub 12,14.

In use, each mix tub 12,14 is used to continuously batch mix a cement mixture. By batch mix, it is meant that a predetermined amount of liquid and solid constituents of a cement mixture is combined into a mix tub 12,14 and mixed therein to form a homogenized cement slurry prior to pumping the homogenized slurry out of the mix tub 12,14. By use of such a batch mix process, the proportions of each of the constituent elements of the cement mixture can be very precisely controlled, since such a process only requires measuring and controlling the total quantity of the constituents entered into the mix tub, rather than continuously measuring and controlling the rate of entry of the constituents into the mix tub as is required by use of the above described continuous mix process. By continuous it is meant that the system 10 of the present invention continuously delivers a homogenized cement slurry to a well 16 until a desired amount of the homogenized slurry has been pumped into the well 16. This continuous delivery is accomplished by alternately using each mix tub 12,14 for batch mixing and slurry delivery.

Figure 3:
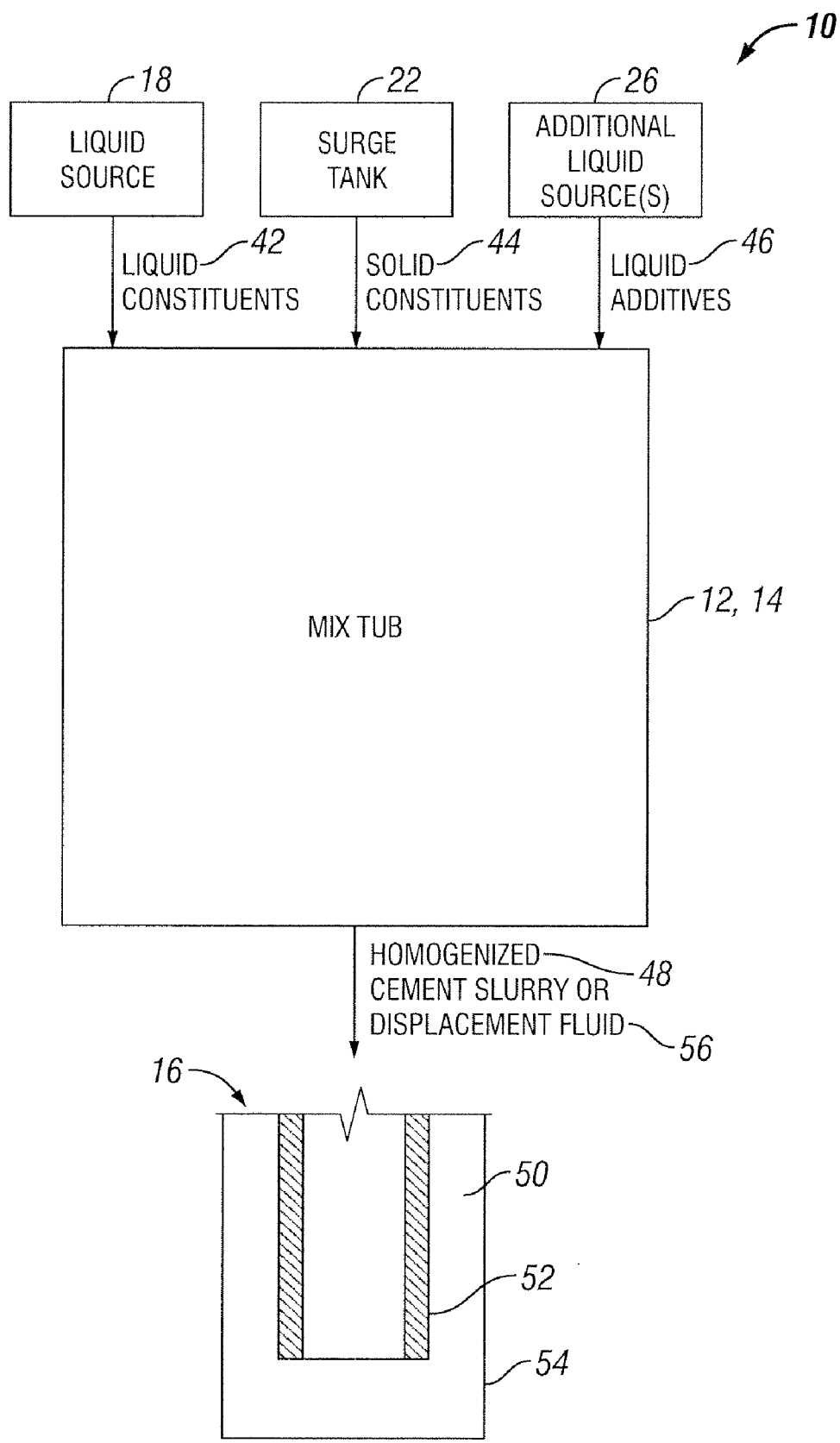
FIG. 3 is a schematic representation of a use of the continuous batch mix system of FIG. 1.

FIG. 3 shows a schematic representation of a use of the continuous batch mix system 10 according to one embodiment of the present invention. In one embodiment, as shown in FIGS. 1-3 collectively, a predetermined amount of liquid constituents 42 of a cement mixture is pumped from the liquid source 18 to the first mix tub 12 through the liquid conduit 20. As the liquid constituents 42 are pumped into the first mix tub 12, the measurement system 40 measures the mass of the first mix tub 12. When the measurement system 40 indicates a desired amount of liquid constituents 42 in the first mix tub 12, entry of the liquid constituents 42 into the first mix tub 12 is shut off either manually or automatically by the control system 38.

A predetermined amount of solid constituents 44 of the cement mixture is then fed from the surge tank 22 to the first mix tub 12 through the solids conduit 24. As the solid constituents 44 are fed into the first mix tub 12, the measurement system 40 measures the mass of the first mix tub 12. When the measurement system 40 indicates the desired amount of solid constituents 44 in the first mix tub 12, entry of the solid constituents 44 into the first mix tub 12 is shut off either manually or automatically by the control system 38.

Depending on the chemical composition of the solid constituents 44, additional liquid additives 46 from the additional liquid source(s) 26 may or may not be needed. In embodiments where the liquid additives 46 are needed, a predetermined amount of liquid additives 46 is then pumped from the additional liquid source(s) 26 to the first mix tub 12 through the liquid additives conduit(s) 28. As the liquid additives 46 are pumped into the first mix tub 12, the measurement system 40 measures the mass of the first mix tub 12. When the measurement system 40 indicates the desired amount of liquid additives 46 in the first mix tub 12, entry of the liquid additives 46 into the first mix tub 12 is shut off either manually or automatically by the control system 38. In other embodiments the liquid additives 46 may be metered in a different manner.

Thus, a batch of the desired cement mixture is contained in the first mix tub 12. The batch mixture in the first mix tub 12 is then mixed by any of the homogenizing means discussed above to form a homogenized cement slurry. In one embodiment the homogenizing means is activated as soon as the solid constituents 44 begin entering the first mix tub 12 and continues for a desired time period after all of the constituent elements of the cement mixture have been added to the first mix tub 12. This ensures an adequate mixing of the elements to form the desired homogenized cement slurry.

After the homogenized cement slurry is formed in the first mix tub 12, it is delivered to the pumping system 25 through the outlet conduit 30. Simultaneous to the delivery of the homogenized slurry from the first mix tub 12, a new batch of homogenized cement slurry is prepared in the second mix tub 14 in the same manner as is described above with respect to the first mix tub 12. Homogenized slurry is delivered from the first mix tub 12 to the pumping system 25 until the first mix tub 12 is empty. At this time, the homogenized slurry contained in the second mix tub 14 is delivered from the second mix tub 14 to the pumping system 25 through the outlet conduit 30. Simultaneous to the delivery of the homogenized slurry from the second mix tub 12 to the pumping system 25, a new batch of homogenized cement slurry is prepared in the first mix tub 14. Homogenized slurry is delivered from the second mix tub 14 to the pumping system 25 until the second mix tub 14 is empty. At this time, the now homogenized slurry from the first mix tub 12 is delivered to the well pumping system 25 and a new batch of homogenized cement slurry is prepared in the second mix tub 14. During this process homogenized slurry is continually pumped from the pumping system 25 to the well 16 until the desired amount of homogenized cement slurry has been delivered.

In one embodiment, the amount of time required to mix a new batch of homogenized cement slurry within one of the mix tubs 12,14 is less than the amount of time required to deliver the homogenized cement slurry out of the other of the mix tubs 12,14 in order for the slurry to be continuously delivered to the pumping system 25. This continuous batch mix process results in a homogenized cement slurry being continuously pumped from the continuous batch mix system 10 to the well 16.

After the desired amount of homogenized cement slurry 48 is pumped into the well 16, a displacement fluid, such as water, is typically pumped behind the slurry to direct the slurry 48 up an annulus 50 between the wall 54 of the well 16, and a casing string 52 within the well 16. This forces the cement into the annulus between the casing string 52 and the well wall 54. Typically, a separate "displacement tank" is used to supply and measure the quantity of displacement fluid used. However, with the arrangement of the present invention, after the desired amount of homogenized cement slurry 48 has been pumped into the well 16, each of the mix tubs 12,14 may be used as a displacement tank.

For example, in one embodiment, after the desired amount of homogenized cement slurry 48 has been pumped into the well 16, a displacement fluid 56, such as water, is pumped from the liquid source 18 to the first mix tub 12 through the liquid conduit 20. This pumping continues until the first mix tub 12 is full. The displacement fluid 56 is then pumped from the first mix tub 12 to the well 16. As the first mix tub 12 is emptied, the second mix tub 14 is filled with displacement fluid 56. The displacement fluid 56 from the second mix tub 14 is then pumped in the well 16 while the first mix tub 12 is filled with displacement fluid 56. As the displacement fluid 56 is pumped in the mix tubs 12,14, the measurement system 40 measures the accumulated mass of displacement fluid. When this accumulated mass reaches a predetermined amount, entry of the displacement fluid 56 into the mix tubs 12,14 is shut off either manually or automatically by the control system 38, and the cementing operation is complete.

Although the measurement system 40 is described above as measuring the mass of the constituent elements of the cement mixture in each mix tub 12,14 during the continuous batch mixing process, in alternative embodiments an alternative measurement system may measure other properties of the constituent elements of the cement mixture indicative of the quantity of the constituents in each mix tub 12,14, such as volume or another appropriate property.

For example, as shown in FIG. 1, in one embodiment such an alternative measurement system 40' includes a level sensor placed on or within each mix tub 12,14. In such an embodiment, the level sensor performs as that described above with respect to the mass measurement system 40. That is, the liquid constituents 42, the solid constituents 44, and (if needed) the liquid additives 46 are added to each mix 12,14 until the level sensor 40' indicates a desired volume of the added constituents 42,44,46. Such a volumetric measurement system 40' may similarly be used to measure a quantity of displacement fluid 56 in each mix tub 12,14 when the mix tubs 12,14 are being used as displacement tanks.

Hereinafter for simplicity of discussion and to avoid duplicity, it will be assumed that the desired cement mixture may be obtained from the solid and liquid constituents contained in the liquid source 18 and the surge tank 22.

In some situations, rather than adding the solid and liquid constituents of a cement mixture separately in the mix tubs 12,14, it may be desirable to combine the solid and liquid constituents of the cement mixture simultaneously, or at least temporally overlappingly, in the mix tubs 12,14. Such a sequence decreases the total time it takes for the constituents to be added to the mix tubs 12, 14 and hence increases the rate at which the resultant homogenized cement slurry may be pumped to the well 16.

In such an embodiment, a flowmeter 60 (as shown in FIG. 1) may be placed in the liquid conduit 20 which connects the liquid source 18 to the mix tubs 12,14. The flowmeter 60 may be used to measure the volume and/or mass of the liquid constituents entering the mix tub 12,14 from the liquid source 18. The liquid constituents may continue to enter the mix tub 12,14 until the flowmeter 60 indicates that a desired volume and/or mass of the liquid constituents is in the mix tub 12,14.

Simultaneous, or at least overlapping, with the entry of the liquid constituents into the mix tub 12,14, is the entry of the solid constituents from the surge tank 22. In such an embodiment the solid constituents enter the mix tub 12,14 until the measurement system 40,40' indicates that a desired amount of the solid constituents is in the mix tub 12,14. In one embodiment, the solid constituents are entered into the mix tub 12,14 until the mass measurement system 40 indicates that a desired total mass of the solid and liquid constituents is in the mix tub 12,14. In another embodiment, the solid constituents are entered into the mix tub 12,14 until the volume measurement system 40' indicates that a desired total volume of the solid and liquid constituents is in the mix tub 12,14. In one embodiment, entry of the desired amount of liquid constituents is completed before the desired total mass or total volume of the constituents in each mix tub 12,14 is reached. This allows for increased accuracy in metering the desired amount of the solid constituents into the mix tub 12,14.

Note that by continuously measuring the liquid volume or mass in each mix tub 12,14, the amount of liquid in each mix tub 12,14 is always known, which allows for the amount of solids in each mix tub 12,14 at any given time to be deduced. This allows for controlling the entry of both constituent elements.

Figure 4:
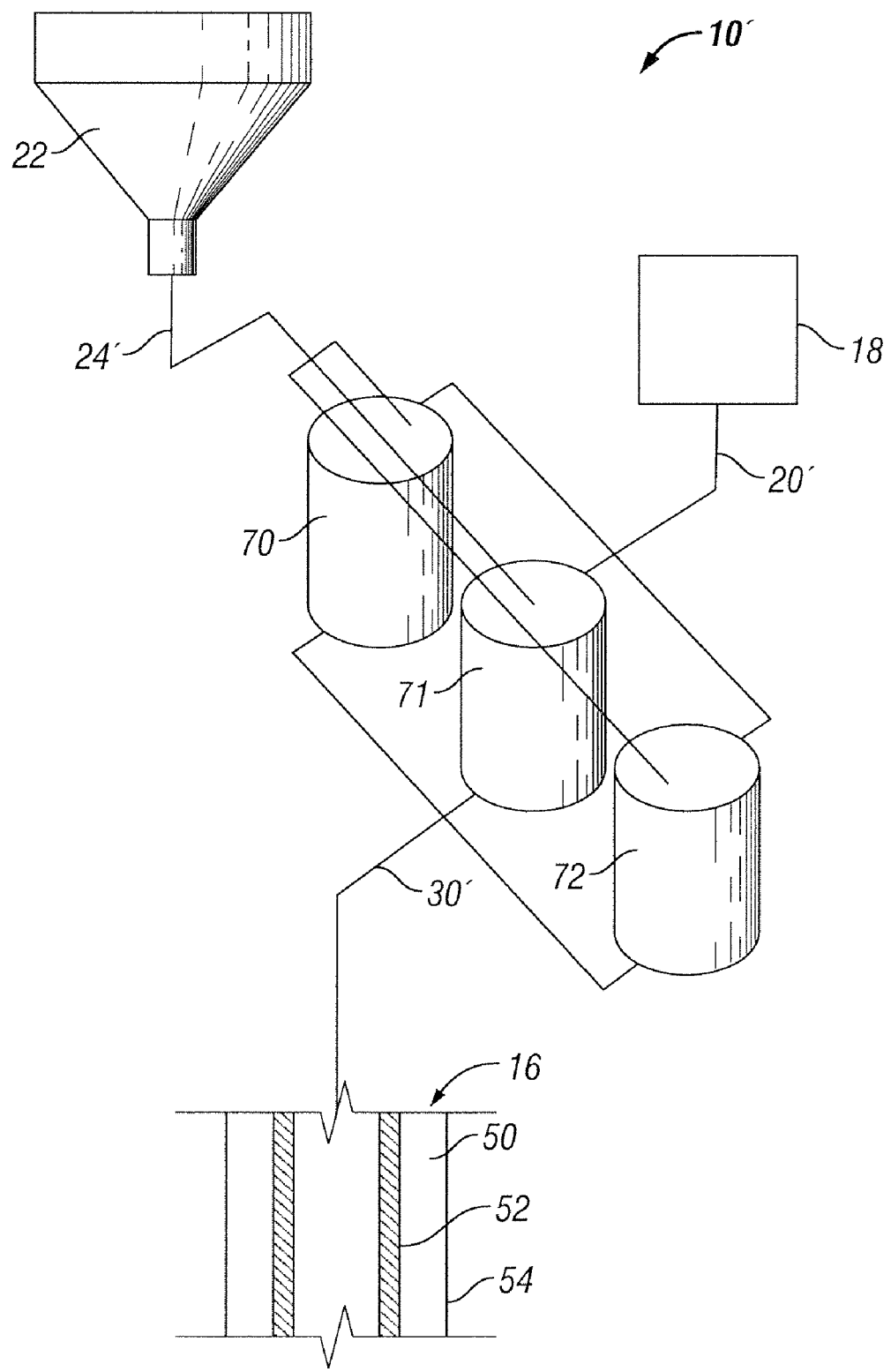
FIG. 4 is a schematic view of a continuous batch mix system according to an alternative embodiment of the present invention.

Note that although the continuous batch mix system 10 is described above as having two mix tubs 12,14, the system 10 may include any number of mix tubs. For example, FIG. 4 shows a schematic representation of a continuous batch mix system 10' that includes three mix tubs 70,71,72. In such an embodiment, each mix tub 70,71,72 is connected to a liquid source 18 through a liquid conduit 20', and a surge tank 22 through a solids conduit 24' for supplying each mix tub 70,71, 72 with solid and liquid constituents of a cement mixture. Each mix tub 70,71,72 also includes any of the homogenizing means discussed above for mixing the constituents therein into a homogenized cement slurry which is pumped to a well 16 through an outlet conduit 30'. The system 10' of FIG. 4 also includes any of the measurement devices described above 60,40,40' for determining the quantity of solid and liquid constituents in each mix tub 70,71,72. In fact, the embodiment of FIG. 4 may include any of the above variations described with respect to FIG. 1-3, which are not repeated hereinafter to avoid duplicity.

One advantage of the embodiment of FIG. 4 is that as a first mix tub 70 is receiving the solid and liquid constituents of a cement mixture, a second mix tub 71 is mixing the solid and liquid constituents received therein into a homogenized cement slurry, and a mixed homogenized cement slurry is being pumped from a third mix tub 72 into a well 16. When the third mix tub 72 is empty, the third mix tub 72 receives the solid and liquid constituents of a cement mixture; the first mix tub 70 mixes its solid and liquid constituents received therein into a homogenized cement slurry; and a mixed homogenized cement slurry is pumped from the second mix tub 71 into the well 16. When the second mix tub 71 is empty, the second mix tub 71 receives the solid and liquid constituents of a cement mixture; the third mix tub 72 mixes its solid and liquid constituents received therein into a homogenized cement slurry; and a mixed homogenized cement slurry is pumped from the first mix tub 70 into the well 16.

As such, the combination of the three mix tub 70,71,72 continuously delivers a homogenized cement slurry to the well 16 as each mix tub 70,71,72 sequentially performs the functions of receiving a cement mixture, mixing the received cement mixture into a homogenized cement slurry, and delivering the homogenized cement slurry to be pumped into the well 16 until the desired total amount of homogenized slurry is pumped into the well 16. Such a sequence separates the receiving and homogenizing times of the tubs involved with mixing, and thereby increases the maximum operating rate of the system 10' to a rate very close to the maximum rate at which the solid and liquid constituents can be delivered to a mix tub 70,71,72.

Also, as described above with respect to FIGS. 1-3, in the embodiment of FIG. 4, each mix tub 70,71,72 may be used as a displacement tank to pump displacement fluid behind the pumped homogenized cement slurry to direct the slurry 48 up the annulus 50 between a wall 54 of the well 16, and a casing string 52 within the well 16.

Figure 5:
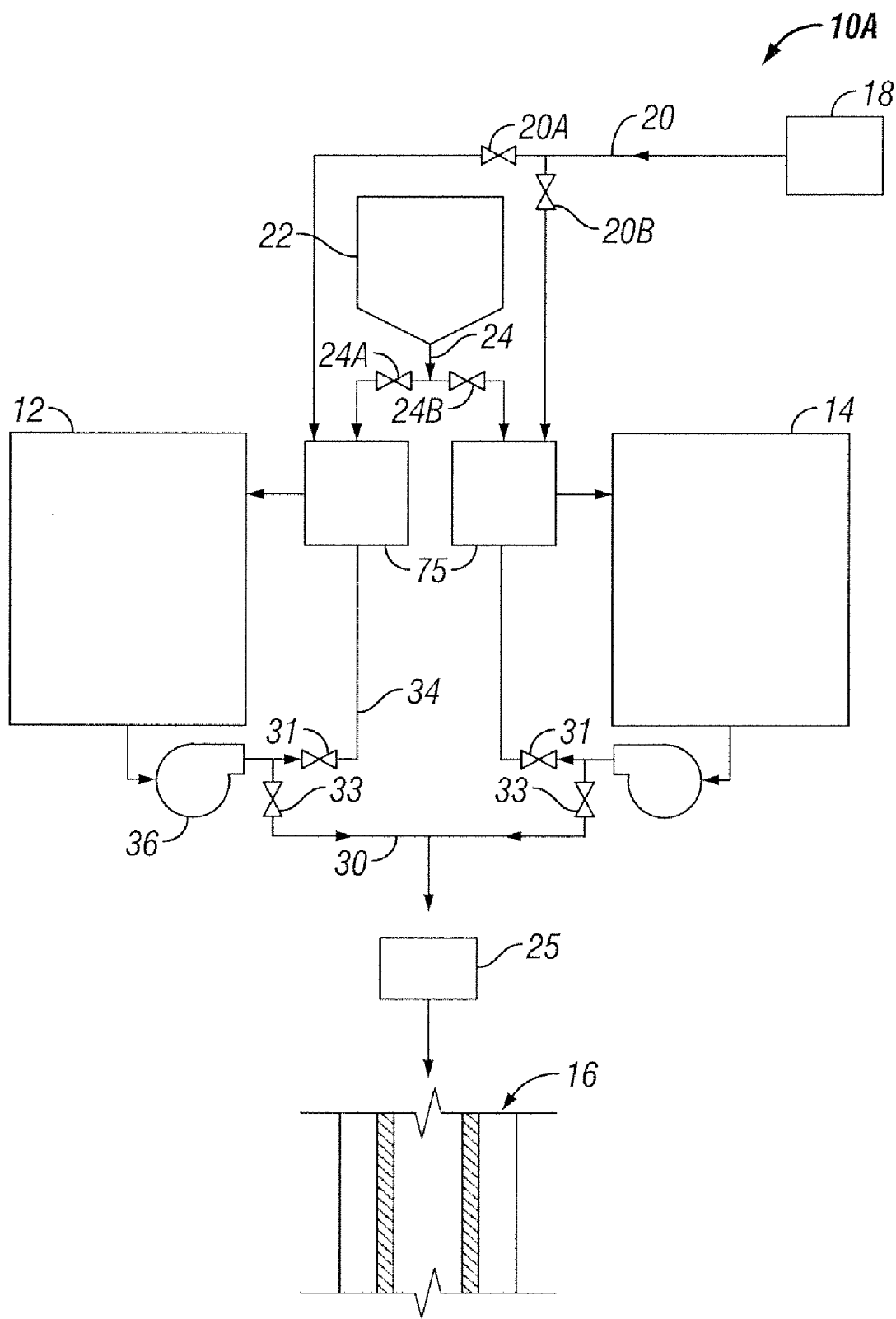
FIG. 5 is a schematic view of a continuous batch mix system according to another alternative embodiment of the present invention.
Figure 6:
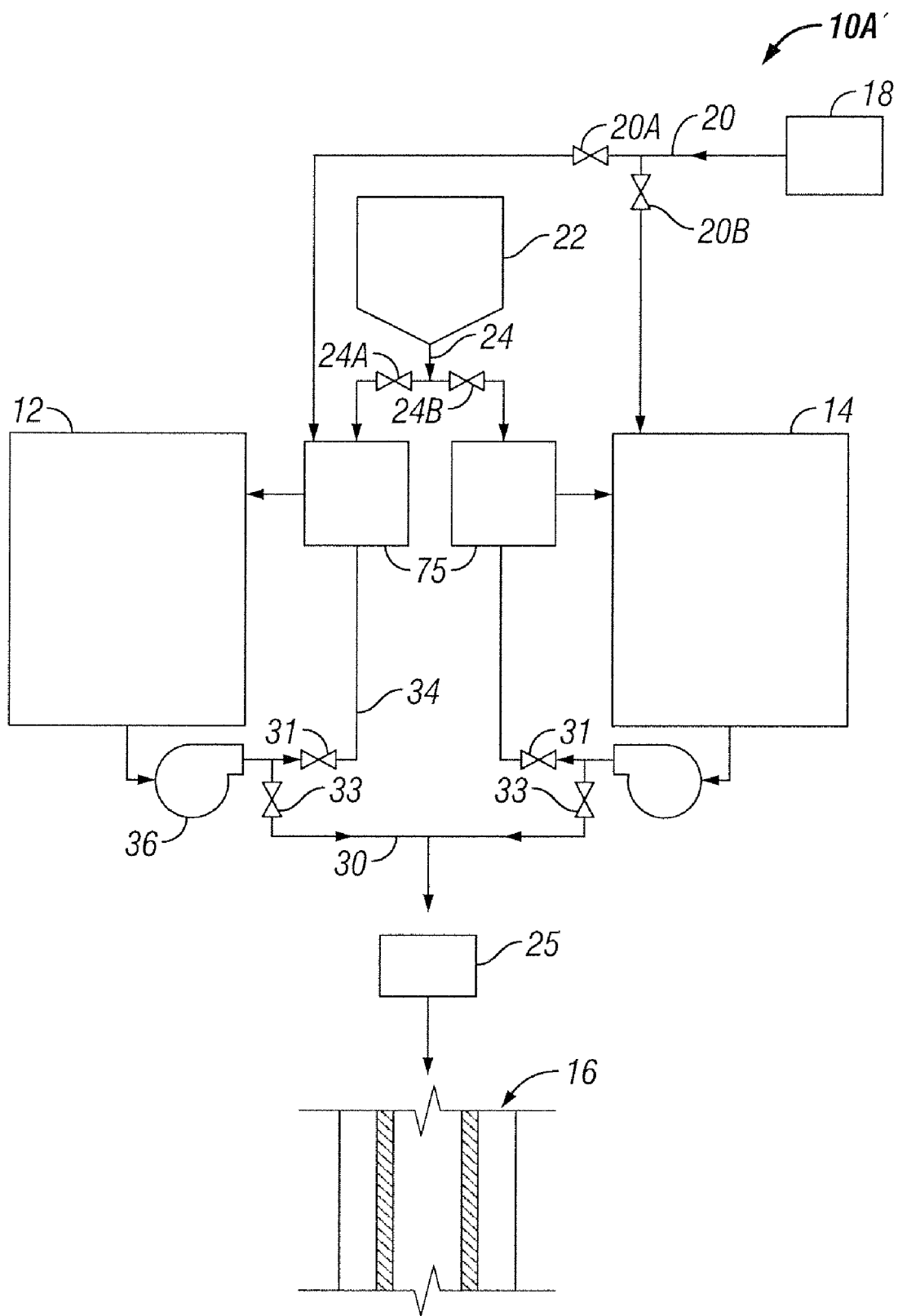
FIG. 6 is a schematic view of a continuous batch mix system according to yet another alternative embodiment of the present invention.

FIGS. 5 and 6 show schematic representations of continuous batch mix systems 10A,10A' according to alternative embodiments of the invention. These systems 10A,10A' each include a mixer 75 that facilitates homogenizing of the solid and liquid constituents of the cement mixture. In the embodiment of FIG. 5, the solid and liquid constituents from the surge tank 22 and the liquid source 18, respectively, enter the mixer 75 before entering the mix tubs 12,14. In the embodiment of FIG. 6, only the solid constituents from the surge tank 22 enter the mixer 75 before entering the mix tubs 12,14. In each of these depicted embodiments, the recirculation flow also enters the mixer 75 to contribute energy to the mixing process. However, in other embodiments this may not be necessary. The systems 10A,10A' of FIGS. 5 and 6 may include any of the measurement devices described above 60,40,40' for determining the quantity of solid and liquid constituents in each mix tub 12,14. In all other respects, the embodiments of FIGS. 5 and 6 may operate and include any of the above variations described with respect to FIG. 1-4 which are not repeated hereinafter to avoid duplicity.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method for continuously batch mixing a homogenized cement slurry comprising:
   providing first and second mix tubs which each perform a process comprising:
   receiving a measured quantity of solid and liquid constituents of a cement mixture, mixing the solid and liquid constituents of the cement mixture into a homogenized cement slurry, and delivering the homogenized cement slurry to a pumping system; and
   wherein the first and second mix tubs alternate said delivering processes in a synchronized manner such that one of the first and the second mix tubs continually delivers its corresponding homogenized cement slurry to the pumping system.

2. The method of claim 1, wherein the first mix tub performs its delivering process as the second mix tub performs its mixing process; and wherein the second mix tub performs its delivering process as the first mix tub performs its mixing process.

3. The method of claim 1, wherein the first mix tub performs its delivering process as the second mix tub performs its receiving and mixing processes; and wherein the second mix tub performs its delivering process as the first mix tub performs its receiving and mixing processes.

4. The method of claim 1, wherein the first and second mix tubs each sequentially perform said receiving, mixing and delivering processes.

5. The method of claim 1, wherein the first and second mix tubs each continually perform said receiving, mixing and delivering processes until a desired quantity of homogenized cement slurry has been pumped from the pumping system to a well.

6. The method of claim 1, wherein the measured quantity in each said receiving process of the first and second mix tubs is a measured mass.

7. The method of claim 1, wherein the measured quantity in each said receiving process of the first and second mix tubs is a measured volume.

8. The method of claim 1, wherein in each said receiving process of the first and second mix tubs, each mix tub receives its liquid constituents separately from its solid constituents.

9. The method of claim 1, wherein in each said receiving process of the first and second mix tubs, each mix tub receives its liquid constituents overlappingly with its solid constituents.

10. A method for continuously batch mixing a homogenized cement slurry comprising:
    providing first, second, and third mix tubs which each perform a process comprising:
    receiving a measured quantity of solid and liquid constituents of a cement mixture, mixing the solid and liquid constituents of the cement mixture into a homogenized cement slurry, and delivering the homogenized cement slurry to a pumping system; and
    wherein the first, second, and third mix tubs alternate said delivering processes in a synchronized manner such that one of the first, second and third tubs continually delivers its corresponding homogenized cement slurry to the pumping system.

11. The method of claim 10, wherein the first, second and third mix tubs each sequentially perform said receiving, mixing and delivering processes.

12. The method of claim 10, wherein the first, second, and third mix tubs perform said receiving, mixing, and delivering processes in a synchronized manner such that when one of the first, second and third mix tubs performs said delivering, another of the first, second and third mix tubs performs said mixing; and a last of the first, second and third mix tubs performs said receiving.

13. The method of claim 10, wherein the first, second and third mix tubs each continually perform said receiving, mixing and delivering processes until a desired quantity of homogenized cement slurry has been pumped from the pumping system to a well.

14. The method of claim 10, wherein the measured quantity in each said receiving process of the first, second, and third mix tubs is a measured mass.

15. The method of claim 10, wherein the measured quantity in each said receiving process of the first, second, and third mix tubs is a measured volume.

16. The method of claim 10, wherein in each said receiving process of the first, second, and third mix tubs, each mix tub receives its liquid constituents separately from its solid constituents.

17. The method of claim 10, wherein in each said receiving process of the first, second, and third mix tubs, each mix tub receives its liquid constituents overlappingly with its solid constituents.

18. A method for continuously batch mixing a homogenized cement slurry comprising:
    providing first and second mix tubs which each perform a process comprising:
    receiving a measured quantity of solid and liquid constituents of a cement mixture, mixing the solid and liquid constituents of the cement mixture into a homogenized cement slurry, and delivering the homogenized cement slurry to a pumping system; and
    wherein the first and second mix tubs alternate said delivering processes in a synchronized manner such that one of the first and the second mix tubs continually delivers its corresponding homogenized cement slurry until a desired quantity of homogenized cement slurry has been pumped from the pumping system to a well; and
    wherein after said desired quantity of homogenized cement slurry has been pumped from the pumping system to the well, a measured quantity of displacement fluid is delivered from the mix tubs to the pumping system.

* * * * *